Aug. 11, 1964
R. N. LANE ET AL
3,144,089
EXPOSURE METER
Filed Feb. 26, 1958
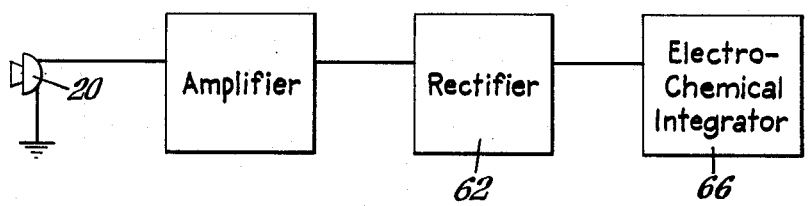
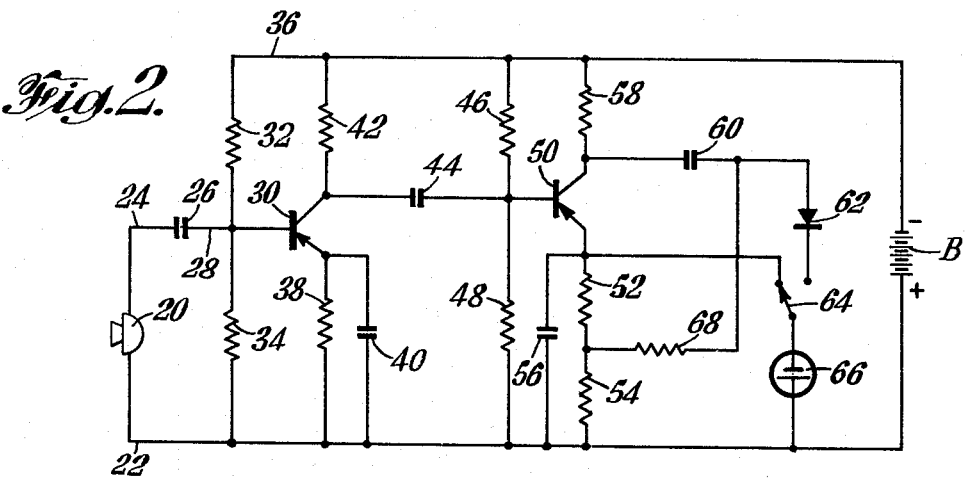
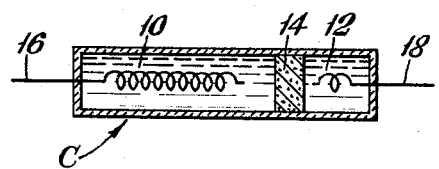
INVENTORS
RICHARD N. LANE
JAMES J. MOORE
BY
ATTORNEY

United States Patent Office 3,144,089
Patented Aug. 11, 1964

3,144,089
EXPOSURE METER
Richard N. Lane and James J. Moore, Austin, Tex., assignors, by mesne assignments, to Union Carbide Corporation, New York, N.Y., a corporation of New York
Filed Feb. 26, 1958, Ser. No. 717,676
7 Claims. (Cl. 181—.5)

This invention relates to a device for indicating accumulated exposure to signals of various types and refers more particularly to a device which may be termed a noise exposure meter.

There is increasing recognition of the possible adverse effect on life and property resulting from exposure to high sound intensities for prolonged periods of time. Such exposure may be encountered in manufacturing establishments and in and around aircraft for example. There is a demand for a device which will give an observable indication of the amount of noise to which a selected area or person is subjected in a given period of time.

It is the principal object of this invention to satisfy this demand. More generally stated, it isa n object of the invention to provide a device which will give an observable indication of accumulated exposure to a signal.

The invention by means of which these objects are achieved will be described with reference to the accompanying drawing, in which:

FIGURE 1 is a block diagram illustrating components of a device embodying the invention;

FIGURE 2 is a wiring diagram of a circuit for use in a device embodying the invention; and FIGURE 3 is a vertical section of an electrochemical integrator of a type used in the device of the invention.

Broadly, the device of the invention comprises a transducer which receives a signal and converts it to electrical energy, a rectifier for passing current of desired polarity from said transducer; and an electrochemical integrator which receives the current passed by the rectifier and gives an observable indication of the integral of the signal received by the transducer, that is, the summation of the signal received by the transducer over a period of time. If necessary, an amplifier may be provided between the transducer and the rectifier. Specifically, as shown in FIGURE 1, the transducer is a microphone and the device is used for measuring exposure to noise.

Before describing the device as a whole, it is appropriate to discuss the electrochemical integrator. This element of the device may be termed an electrochemical coulometer for it gives electrochemically an indication of the quantity of current flowing through it over a period of time. As may be seen by reference to FIGURE 3 of the drawing, an integrator C may comprise a glass tube divided into two compartments 10, 12 by a porous separator 14. These compartments are preferably of different sizes, and the smaller of the two is the indicator of the device. In each of the compartments 10, 12 is a solution of a species of a reversible redox system, and immobilized by the separator 14 is an aqueous solution of another species of the system. Electrodes 16, 18 are provided in the compartments 10, 12 respectively and extend outwardly thereof for making contact to the device.

When an electric current is passed through the integrator, or coulometer, reduction occurs at the cathode and oxidation at the anode and ions are transferred from one compartment to the other. The amount transferred is proportional to the time of application of the current and can be determined visually if the transferred ions are colored.

In a specific type of integrator useful in the device of the invention, the two compartments contain a solution of iodine and potassium iodide in nitrobenzene, and the aqueous solution contains potassium iodide. The measured species of the system is iodine, which being colored, provides a visual indication of the amount of current passed in a period of time, otherwise stated, the integral of the current.

The electrochemical integrator as such forms no part of this invention but is described in detail and claimed in the application of Earl S. Snavely, Jr. concurrently herewith, Serial Number 717,621, now U.S. Patent Number 2,890,414, and assigned to the assignee of this application.

With the foregoing in mind, it will be understood that in the device of the invention when a signal is received by the transducer and passed to the integrator by the rectifier a transfer of ions takes place giving an observable indication of the quantity of current passed for a given time which in turn is directly proportional to the summation of the signal received by the transducer. As will be explained below, provision is made in the device of the invention for preventing the possibility of a false indication.

Reference will now be made to FIGURE 2 of the drawing in which a wiring diagram of a circuit for a device specifically adapted to use as a noise exposure meter is set forth. A microphone 20, suitably of the reluctance type or the dynamic type, is connected by leads 22, 24 to a conventional two-stage transistor amplifier powered by a 2.7 volt battery B. A microphone commercially available under the designation "Shure MC–11" was used in this circuit. The lead 22 is a common lead for the entire circuit to be described. The lead 24 is connected to a coupling condenser 26 of 1 microfarad capacity which serves to block the passage of direct current from the battery B into the microphone 20. The other side of the condenser 26 is connected by a lead 28 to the base of the first transistor 30 type 2N217 manufactured by Radio Corporation of America. Also connected to the base of the transistor 30 by suitable leads are two resistors 32, 34, the former having a value of 56,000 ohms and the latter 33,000 ohms. The opposite sides of the resistors 32, 34 are connected to common leads 36 and 22. The resistors 32, 34 together with a resistor 38 of a value of 10,000 ohms which is connected to the emitter of the transistor 30 and the common lead 22 from the direct current biasing circuit for the transistor 30. A bypass condenser 40 of 10 microfarad capacity is connected across the resistor 38 to pass alternating current from the mircophone 20 to the transistor 30.

To the collector of the transistor 30 and the common lead 36 is connected a load resistor 42 of 15,000 ohms. The second stage of the amplifier includes a coupling condenser 44 of 1 microfarad capacity connected between the collector of the transistor 30 and the base of the second transistor 50 which is also a type 2N217. Resistors 46, 48 of 39,000 ohms and 18,000 ohms respectively are connected between the common leads 22 and 36 to the base of the transistor 50. The direct current biasing circuit for the transistor 50 is formed by the resistors 46, 48 and two resistors 52, 54 of 3900 ohms and 390 ohms respectively connected in series. The resistor 52 is connected to the emitter of the transistor 50, and the resistor 54 is connected to the common lead 22. A by-pass condenser 56 of 10 microfarad capacity is connected across the resistors 52, 54. A load resistor 58 of 4700 ohms is connected to the collector of the transistor 50 and the common lead 36.

The alternating current signal from the amplifier is coupled through a condenser 60 of 1 microfarad capacity to a rectifier 62 through a single pole, double throw switch 64 to an electrochemical integrator 66. The rectifier 62 is a germanium junction diode having a reverse current of approximately 0.25 microampere at 1 volt. The electrochemical integrator 66 is preferably of the construction described above. Its A.C. resistance measured at 1000 cycles should be about 12,000 ohms to match the output impedance of the amplifier.

The switch 64 is used to place the integrator in the integrating cycle or the "clearing" cycle depending upon the position of the movable contact. When the contact is connected to the rectifier 62, the integrator is connected in the integrating cycle. When the movable contact of the switch 64 is in the position shown in FIGURE 2, the integrator 66 is in the clearing cycle in which indication of previous current passage is removed by transfer of ions in the direction opposite to the direction of ion transfer during integration.

Connected at the junction of the resistors 52, 54 and to one side of the coupling condenser 60 is a resistor 68 of 12,000 ohms. The resistor 68 serves the function of providing a load resistance to the amplifier on the nonrectified half cycle equivalent to the load resistance of the integrator 66 so as to prevent charging the coupling condenser 60 to such an extent that it would block passage of alternating current to the rectifier 62. The resistor 68 and the resistor 54 to which it is connected together serve to prevent discharge through the rectifier 62 of the concentration difference voltage across the integrator when in the integrating position and just after this difference voltage has been brought to a maximum by a clearing cycle. Should such discharge occur an error would result, for this discharge would pass through the rectifier 62 into the integrator 66 to give indication of the passage of current, even though no signal was received at the microphone 20.

The portion of the circuit just described is important to proper and accurate operation of the device of the invention. A more detailed explanation of it is therefore in order. When the integrator 66 is in the so called "cleared" condition, the difference in concentration of iodine in solution in the two compartments is at its maximum. This difference in concentration gives rise to a difference in potential of such polarity that the integrator would tend to discharge this potential difference through the rectifier 62 in the "forward" direction which in turn would give an indication in the integrator 66 of current flow although no acoustic signal was present. To prevent this, the resistors 54 and 68 are so connected and of such value as to prevent discharge of this voltage through the rectifier 62. In the circuit illustrated in FIGURE 2 with components of the values recited the voltage across the integrator 66 in the cleared condition is about 0.05 to 0.06 volt. The voltage drop across the resistor 54 is 0.07 volt. The algebraic sum of these two voltages is 0.01 to 0.02 volt across the rectifier 62 in the "reverse" direction. The reverse direction current of the rectifier at this voltage is about 0.25 microampere. Flow of a current of this magnitude for as long as 24 hours will have no significant effect on the integrator 66. On the other hand, when an acoustic signal is received, this reverse voltage is overcome, and current is passed through the integrator 66 in the proper direction to give indication of current flow.

It will be appreciated that the values of the components of the circuit illustrated in FIGURE 2 are inter-dependent, and that, for instance if the battery B is of substantially different voltage and the operating characteristics of the transistors 30, 50 are different, the values of the other components must be correspondingly changed.

Noise exposure meters embodying the invention and utilizing the circuit of FIGURE 2 have been constructed, tested, and found to be very satisfactory and sensitive. For example, the device is operative in the range 75 to 95 decibels (reference 0.0002 dyne/square centimeter) and the overall voltage gain of the two stage amplifier is about 44 db. A sound level of 95 db will produce noticeable coloring of the small volume side of the integrator in ten minutes. The device can be made in miniature size and has been made and assembled, including a microphone, in a container about 2¼ inches by 1¾ inches by ⅞ inch in size. It is accordingly convenient to wear or carry upon the person. As indicated above, it may be "read" by visual observation of color change, or the open circuit voltage of the integrator may be measured.

It will be understood that the invention has been described in detail for purposes of illustration of its principles and that changes in components of the circuit described can be made without departing from the spirit of the invention. For example other types of transistors than that mentioned may be used. Similarly, a silicon diode rectifier may be used in place of the germanium diode rectifier; the use of a silicon diode rectifier is desirable where extreme accuracy is necessary over long periods of time.

The device of the invention may also be modified to alter its range of sensitivity to sound pressure by appropriate, conventional modification of the amplifier circuit, for example by the introduction of attenuating circuits between the microphone and the amplifier.

While the invention has been described with particular reference to its applicability as a noise exposure meter, it will be apparent to those skilled in the art that it can be used for other purposes by replacing the microphone 20 with a transducer sensitive to other signals, such as radiation, for instance.

We claim:

1. A device indicating accumulated exposure to a signal, which device comprises in combination a transducer for converting such signal to electrical energy; a rectifier for passing current of desired polarity from said transducer; and an electrochemical integrator, said integrator comprising a vessel separated into two compartments, one of which compartments contains a solution of a species of a reversible redox system and the other of said compartments containing a solution of another species of said system, said integrator receiving current passed by said rectifier which current causes one of said species to be transferred from one compartment to the other, thereby producing an observable indication of the integral of the signal received by said transducer.

2. A device as claimed in claim 1 in which an amplifier is provided for amplifying the current produced by said transducer.

3. A device as claimed in claim 2 for indicating exposure to noise and in which said transducer is a microphone.

4. A device as defined by claim 1 in which means is provided between said rectifier and said integrator for preventing discharge of the potential difference produced in said integrator by differences of concentration therein through said rectifier in a direction such as to cause an indication of current flow through said integrator in the absence of a signal received by said transducer.

5. A noise exposure meter adapted to indicate accumulated exposure to noise over a period of time, which meter comprises, in combination, a microphone, an amplifier, a rectifier and an electrochemical integrator to which amplified, rectified current is supplied from said microphone, said integrator comprising a closed vessel separated into two compartments by a porous separator, one of which compartments contains a solution of a species of a reversible redox system and the other of said compartments containing a solution of another species of said system, said current when supplied to said integrator causing one of said species to be transferred from one compartment to the other, thereby producing an observable indication of the integral of said current.

6. A noise exposure meter as defined in claim 5 in which means is provided for preventing discharge through said rectifier of the potential difference produced in said integrator by differences of concentration in said solution in said compartments in a direction such as to cause indication of current flow through said integrator in the absence of an acoustic signal received by said microphone.

7. A noise exposure meter as defined by claim 6 in which said means comprises a resistor shunting said rectifier and said integrator of such value and in such fashion that the voltage drop across it and the potential difference in the integrator are nearly equal.

References Cited in the file of this patent

UNITED STATES PATENTS

| | | |
|---|---|---|
| 281,352 | Edison | July 17, 1883 |
| 925,064 | Whitney | June 15, 1909 |
| 2,413,936 | Winlund | Jan. 7, 1947 |
| 2,469,282 | Stanmyre | May 3, 1949 |
| 2,480,607 | Rackey et al. | Aug. 30, 1949 |
| 2,590,460 | Rackey et al. | Mar. 25, 1959 |
| 2,884,085 | Von Wittern et al. | Apr. 28, 1959 |
| 2,890,414 | Snavely | June 9, 1959 |
| 2,910,648 | Keller | Oct. 27, 1959 |